DUAL DIRECTIONAL TAPE PLAYER

Filed April 12, 1963 7 Sheets-Sheet 1

INVENTORS
VAL BURTON
FRANK E. ROPES
BY
Beehler & Shanahan
ATTORNEYS

March 21, 1967 V. BURTON ET AL 3,310,638

DUAL DIRECTIONAL TAPE PLAYER

Filed April 12, 1963 7 Sheets-Sheet 2

INVENTORS
VAL BURTON
FRANK E. ROPES

BY Beehler & Shanahan
ATTORNEYS

INVENTORS
VAL BURTON
FRANK E. ROPES
BY
Beehler & Shanahan
ATTORNEYS

DUAL DIRECTIONAL TAPE PLAYER

Filed April 12, 1963 7 Sheets-Sheet 4

INVENTORS
IAL BURTON
FRANK E. ROPES
BY
Beehler & Shanahan
ATTORNEYS

INVENTORS
VAL BURTON
FRANK E. ROPES
BY
Beehler & Shanahan
ATTORNEYS

INVENTORS
VAL BURTON
FRANK E. ROPES
BY
Beehler & Shanahan
ATTORNEYS

March 21, 1967 V. BURTON ET AL 3,310,638

DUAL DIRECTIONAL TAPE PLAYER

Filed April 12, 1963 7 Sheets-Sheet 7

INVENTORS
VAL BURTON
FRANK E. ROPES
BY
Beehler & Shanahan
ATTORNEYS 3,310,638

DUAL DIRECTIONAL TAPE PLAYER

Val Burton, Los Angeles, and Frank E. Ropes, Van Nuys, Calif., assignors to Autolecture, Inc., New York, N.Y., a corporation of New York Filed Apr. 12, 1963, Ser. No. 272,800
14 Claims. (Cl. 179—100.2)

This invention relates generally to magnetic tape players, or the like, which are able to audibly reproduce the sound of voice or music recorded on tape, by slowly passing the tape from a supply reel to a take-up reel past a playback head, which detects the recorded sound and, through an amplifier, actuates a reproducing speaker. More particularly, the invention is concerned with the mechanical system of a tape player for selectively transporting a tape in either direction between two reels, and selectively reproducing sound from either of two tracks on said tape, one track being recorded for one direction of tape movement, and the other track being recorded for the opposite direction of tape movement.

This application is a continuation-in-part of a co-pending application of the same inventors, Ser. No. 103,-281, filed April 17, 1961, now abandoned, for a "Dual Directional Tape Player."

The novel mechanical system employs a pair of slides on the underside of the tape deck, a reversing slide which transports a pair of clutches and actuates a reversing switch, and an idler transport slide which moves in the same direction, to produce tape movement, regardless of which direction the reversing slide is transported. In a preferred form of the invention, the two slides co-operate to selectively place one of a pair of recording heads in recording association with the moving tape.

Two embodiments of the invention are illustrated in detail hereinafter. In the first, a single lever selectively operates the tape recorder in either of two directions, or places it in a shut-off position. In the second embodiment, the lever merely determines whether the tape recorder is "on" or "off," whereas a separate and independent lock mechanism selects the direction of tape travel, when the lever is in the "on" position.

There are many educational, industrial, and entertainment uses for a tape recorder adapted to repeat over and over again the same recorded lecture, musical piece, or other sound record. Unfortunately, tape recorders of the past have generally been capable of reproducing sound only with one direction of tape movement; the tape recorder could not be re-used to reproduce the same lecture from the same tape without first rewinding the tape in the reverse direction, and then re-transporting it in the single direction in which it was capable of reproducing sound.

It has been proposed to provide the tape with two tracks, one track recorded in one direction and the other track recorded in the opposite direction. Obviously, such tracks could be side by side on one side of the tape, or the tape could be separately coated with the magnetic material used for recording on both surfaces so that one side would serve as a track record for one direction and the other side as a track record for the opposite direction. However, the tape recorders themselves have not been adapted for conveniently playing the tape in either direction. In the past, it has been necessary to remove the tape after one playing and switch it to a new position before playing the second track in the opposite direction. In some cases, it has been necessary to manually shift from one recording head to another. In all recorders heretofore known, the tape recorder capable of playing the tape in either direction has been a relatively massive and complex instrument, requiring substantial skill and agility on the part of the operator to shift from reproduction in one direction to reproduction in the opposite direction.

It is a major object of the present invention to provide a lightweight portable tape player capable of switching from playback reproduction from one direction of tape movement to playback reproduction for the opposite direction of tape movement by the operation of a simple reversing lever.

It is an associated major object of the invention to provide a dual directional tape player which can be entirely sealed and protected from unskilled handling, and switched to either direction of play, or to a rest position by manual operation of a single external control, without the need for any reel shifting, playback head adjustment, tape driving control, or electrical switch operation by the user.

A tape player having the features described has important utility as a mechanical substitute for a human guide or lecturer to describe displays at a sales exhibition or the objects on view in a museum or art gallery. In such an application, the same lecture would be recorded on each of the tapes two tracks. The tape would then be loaded and then locked in the automatic dual directional tape player. Several such players and tapes would be provided so that each individual wishing a lecture guide could carry one of the recorders, listening to a lecture as he moved from point to point. It is an important feature of the tape player of the present invention that the user can interrupt its playing and bring it to a stop at any time that he wishes to pause in his progress from one display to another.

Another important feature of the invention is that the enclosed dual directional tape player may be rendered irreversible except by the use of a key, so that a person renting the player for one use will be unable to use it a second time without paying a second rental fee.

The foregoing and other objects and advantages will best be understood from the following description of one preferred specific embodiment of the invention, which is illustrated in the accompanying drawings.

Figure 4:
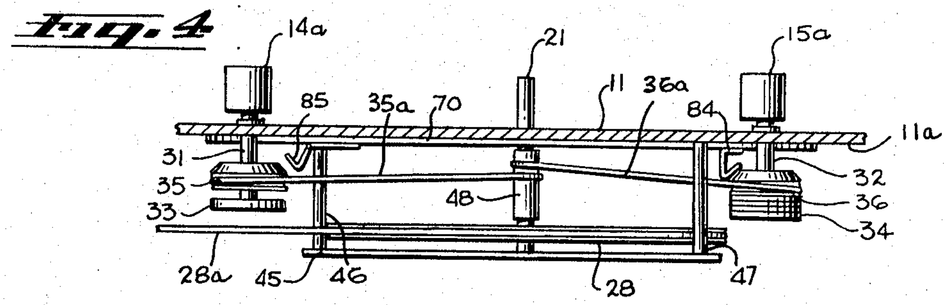
Figures 3, 5:
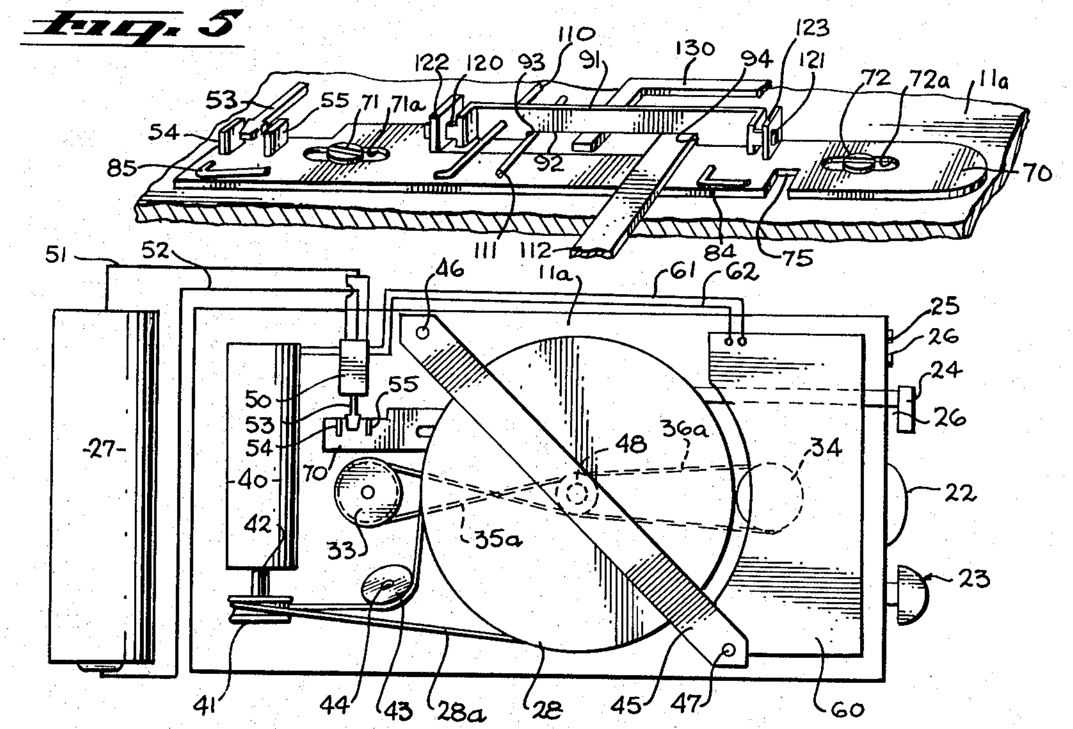
Figure 1:
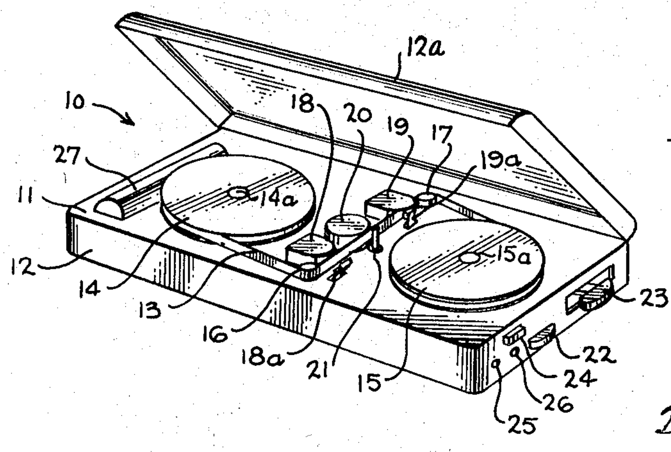
FIGURE 1 is a perspective view of a first embodiment of the tape player invention as it appears housed in a case, with the lid of the case partially opened to reveal the tape deck.
Figure 2:
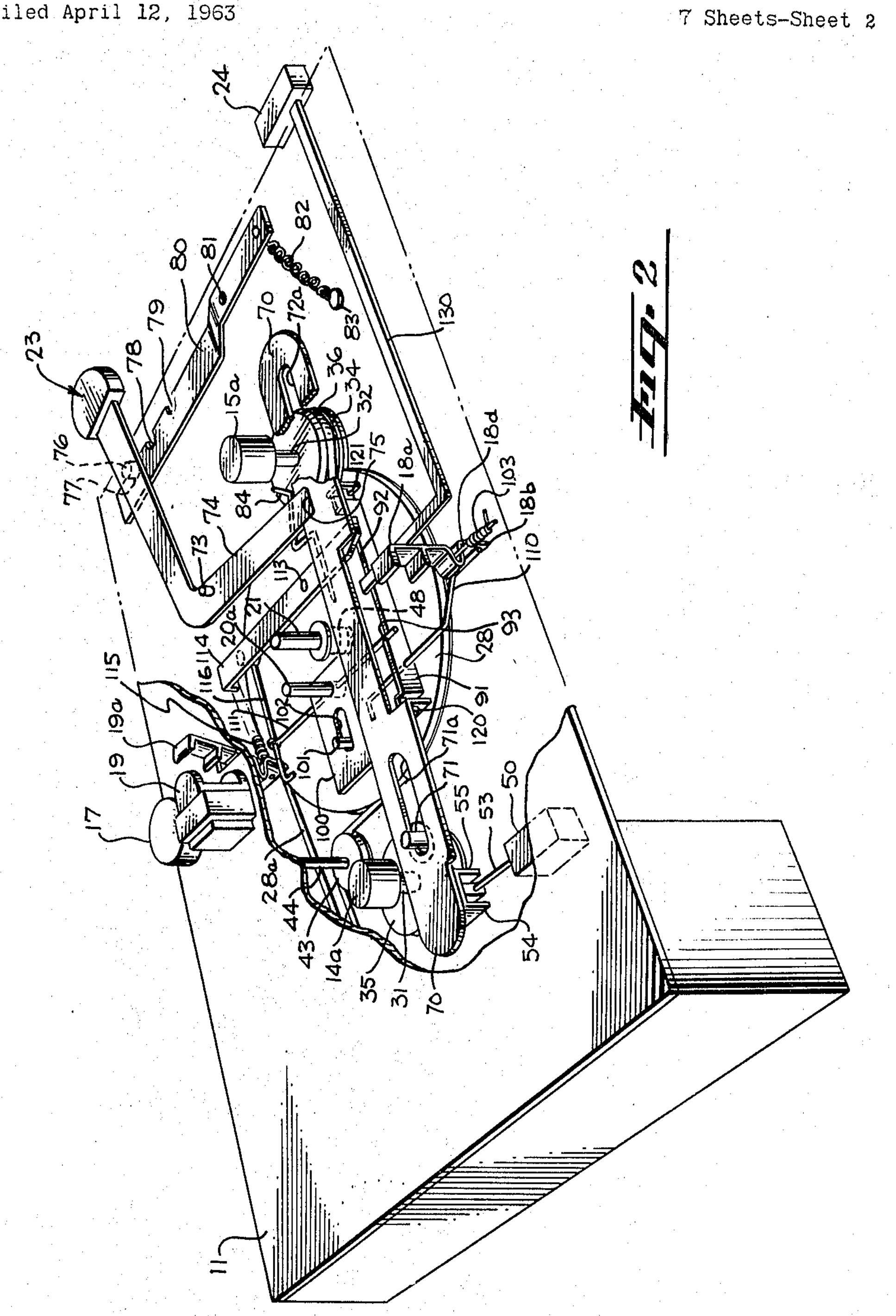
FIGURE 2 is a perspective view of the tape deck of FIGURE 1, with the reels removed, and part of the deck broken away as indicated by the phantom outline, to reveal the shifting mechanism mounted on the underside of the tape deck.
Figures 6, 7, 8:
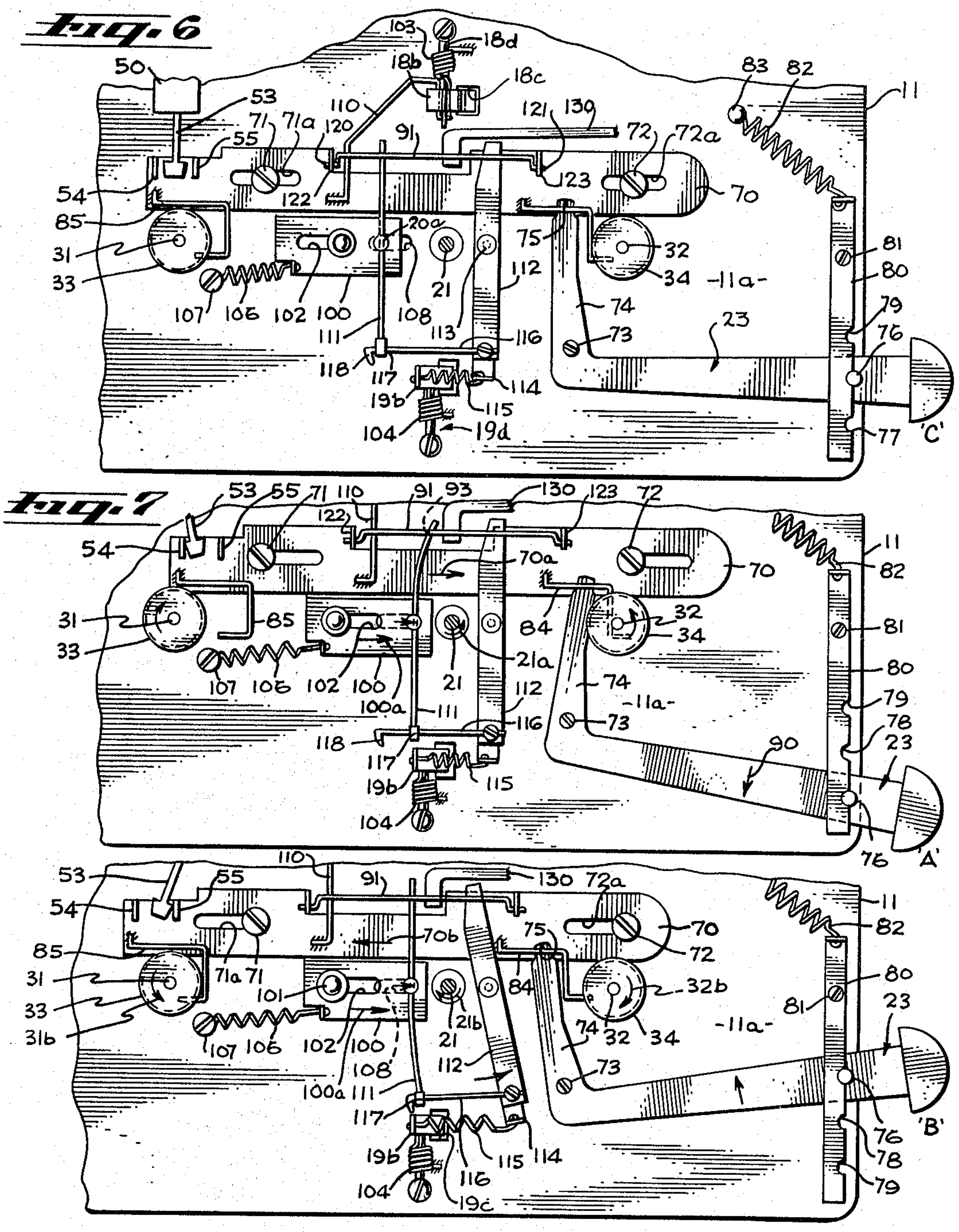
Figures 9, 10, 11:
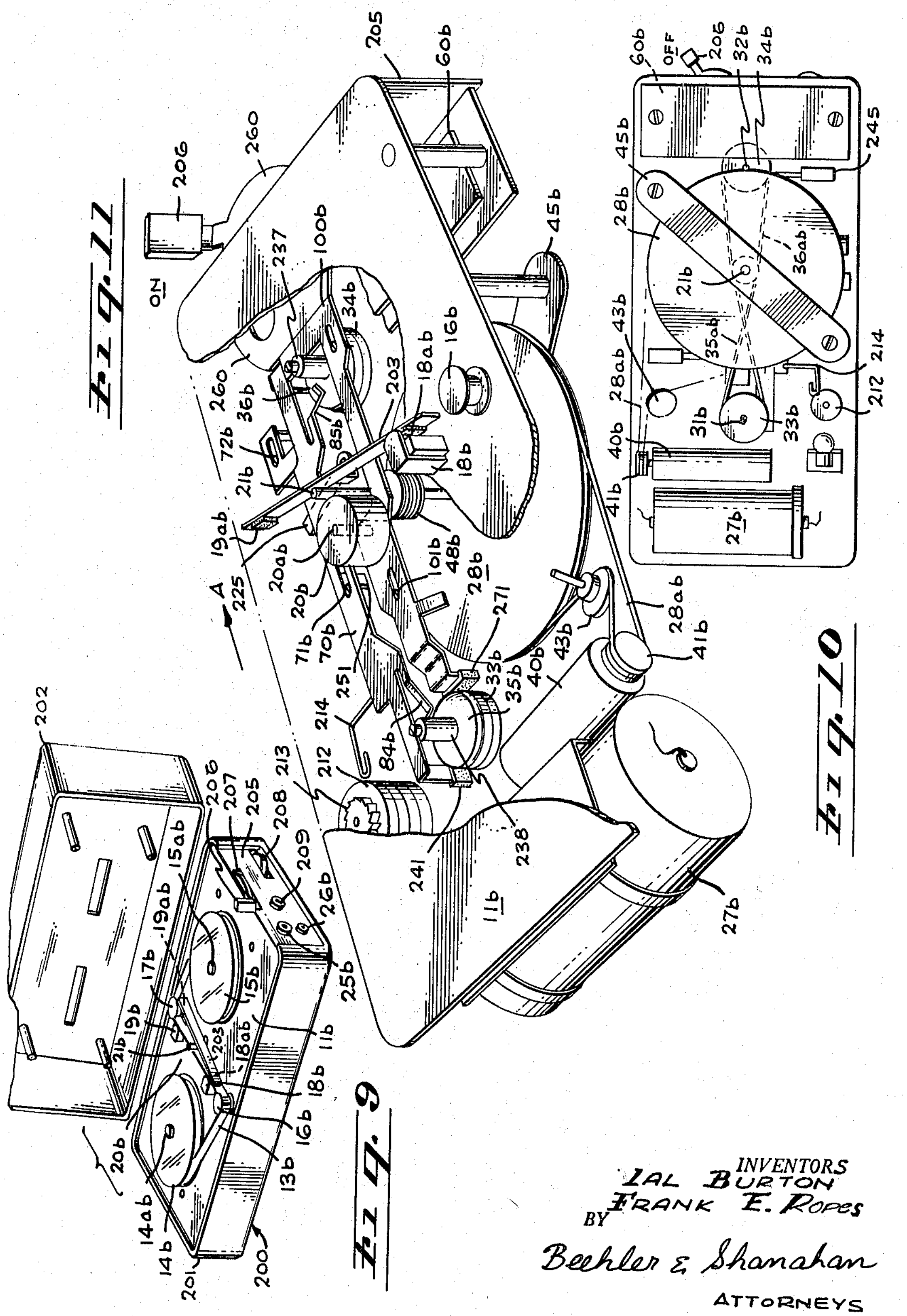
Figures 12, 19:
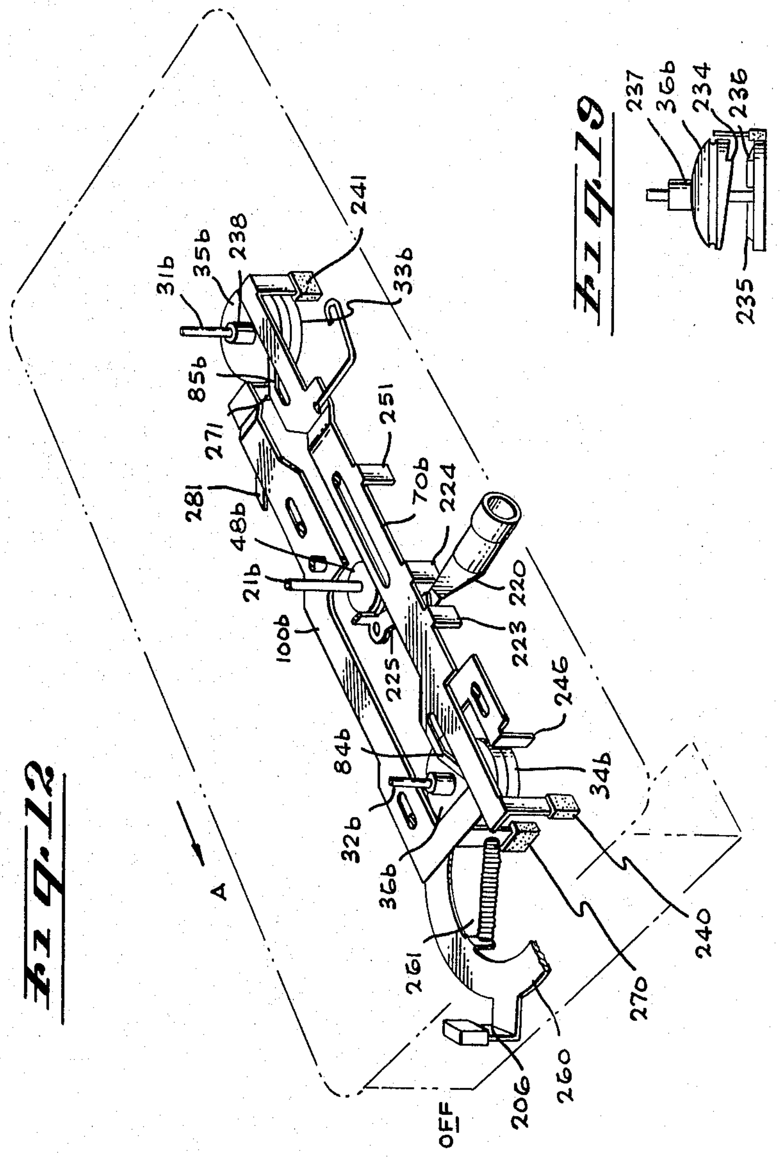
Figure 13:
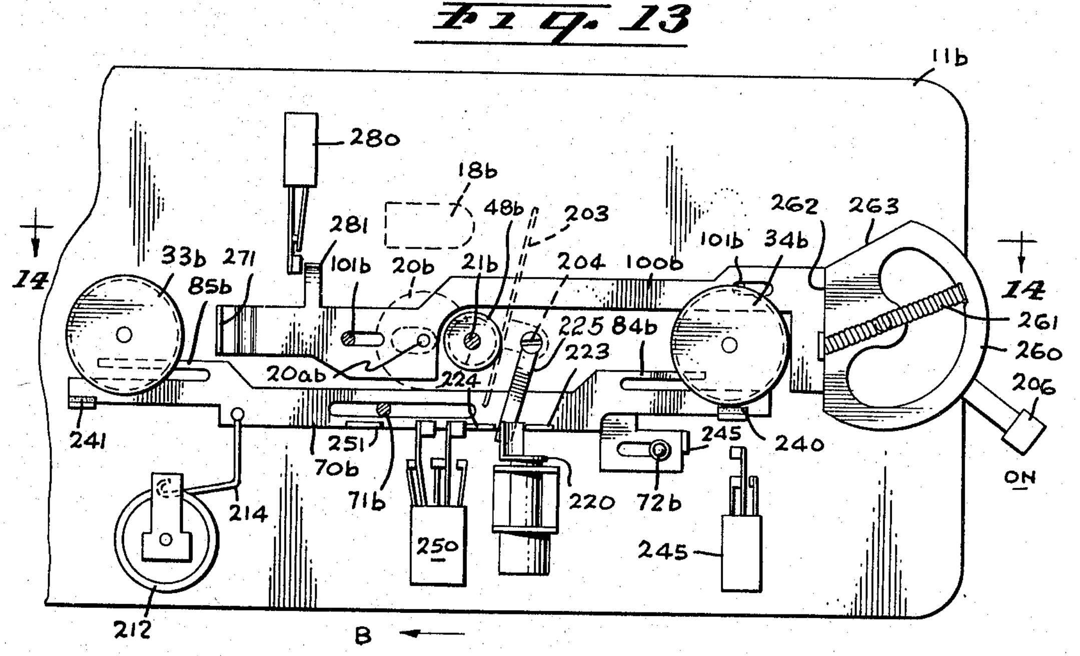
Figure 14:
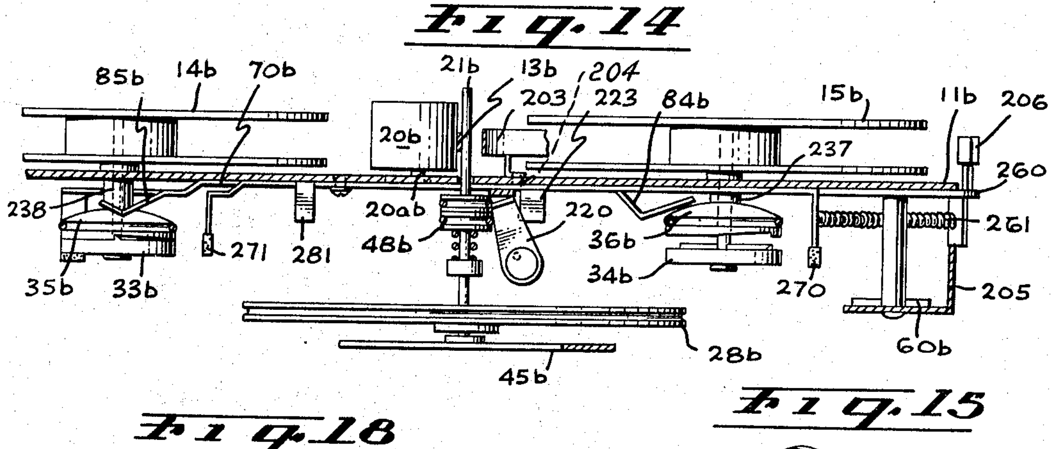
Figure 18:
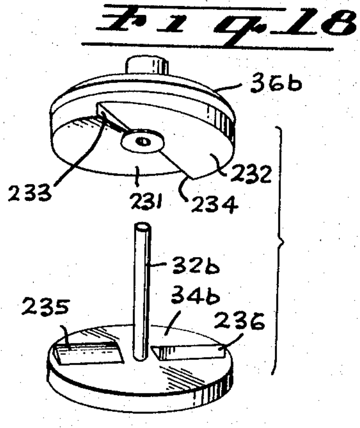
Figure 15:
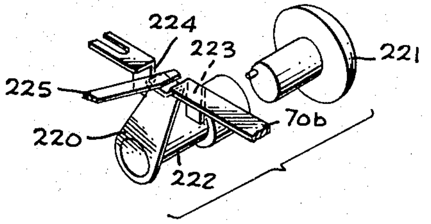
Figure 16:
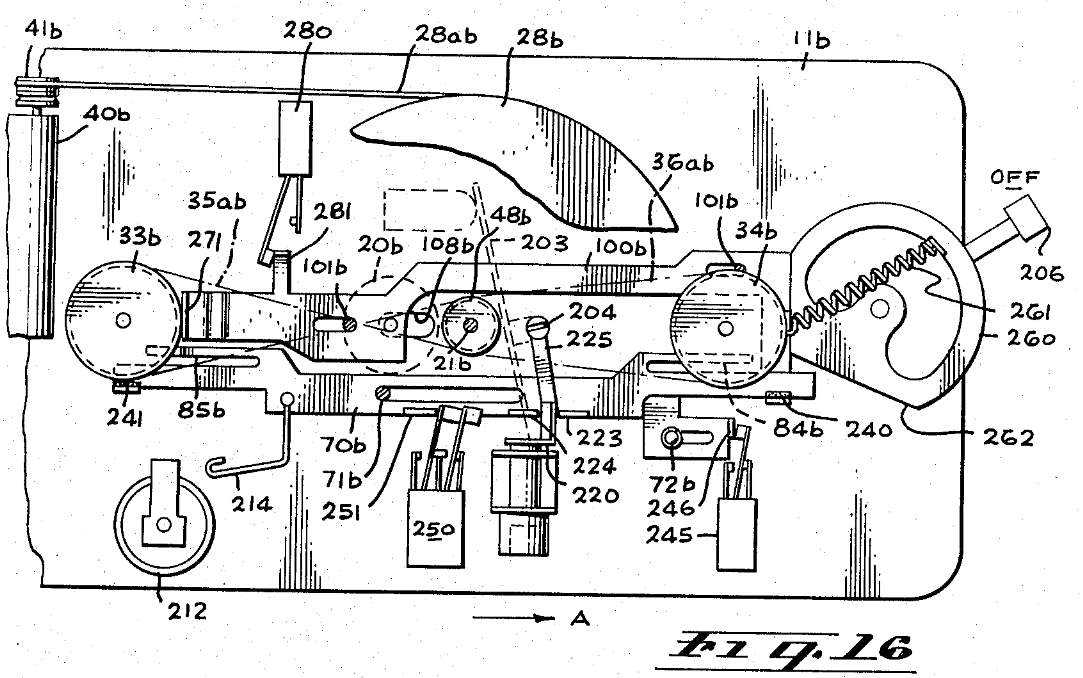
Figure 17:
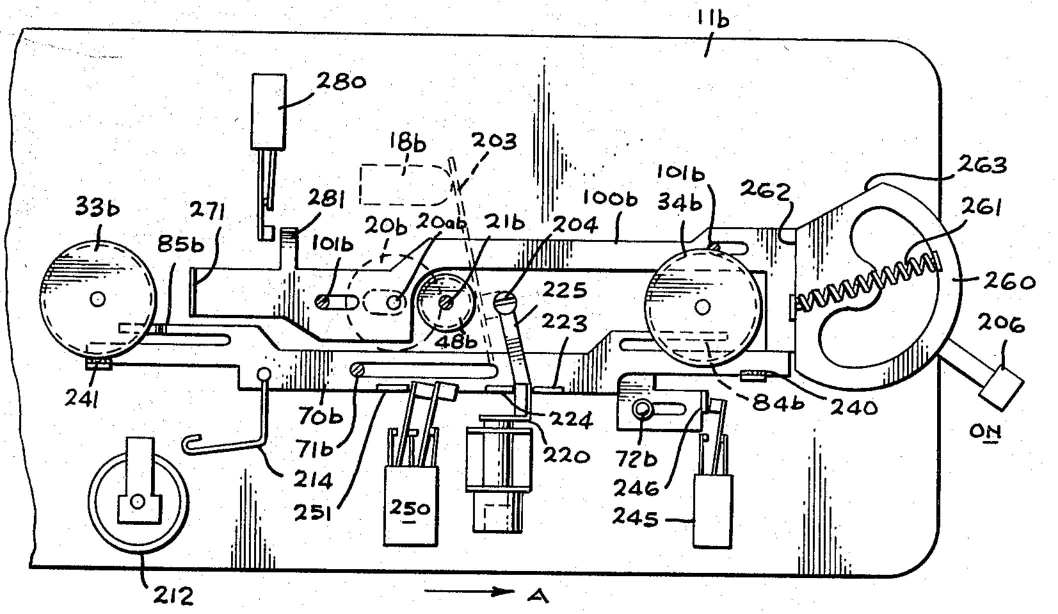

In FIGURES 3 to 8, the tape deck of FIGURE 2 is inverted from the position illustrated in FIGURES 1 and 2, to reveal the driving and shifting mechanism on the underside of the deck, so that:

FIGURE 3 is a plan view of the underside of the tape deck showing the motor, circuitry, and driving pulley system;

FIGURE 4 is a side elevation taken at a vertical section through the tape deck in inverted position, to show the pulley drive system of FIGURE 3;

FIGURE 5 is a perspective view of a portion of the underside of the tape deck, showing the reel-drive reversing slide;

FIGURE 6 is a plan view of a portion of the underside of the tape deck, showing the reversing slide and the drive-engaging slide in the central or shut-off position;

FIGURES 7 and 8 show the same view as FIGURE 6, but with the tape player operating in the opposite A and B directions, respectively;

FIGURE 9 is a perspective view of a second embodiment of the invention, with the upper housing disassembled in order to reveal the upper side of the tape deck;

FIGURE 10 is a perspective view of the tape deck of said second embodiment, with the deck partially broken away, and the tape reels removed, in order to reveal the slides which comprise the shifting mechanism, as viewed looking at their upper surfaces, which are ordinarily covered by the tape deck;

FIGURE 11 is a bottom plan view of the tape player mechanism;

FIGURE 12 is another perspective view of the shifting slides, seen from the upper right front;

FIGURE 13 is a bottom plan view of the tape deck, with the reduction pulley removed to better reveal the slide mechanism, and the reversing slide set for tape travel in the A direction;

FIGURE 14 is a vertical sectional view, seen from the left of the tape recorder, at a section running through the tape deck approximately at a line indicated by the arrows 14—14 in FIGURE 13;

FIGURE 15 is a perspective view of the tape reversing lever;

FIGURES 16 and 17 are bottom plan views, with the switching slides in "off" and "on" positions, respectively, when the tape reversing lever is thrown into the "B" tape travel direction;

FIGURE 18 is a perspective view of the clutch plates used for tape drive; and,

FIGURE 19 is a side elevational view of a tape driving clutch shown with the clutch disengaged and the brake applied.

In FIGURE 1, the tape player indicated generally by the numeral 10 is seen to have its mechanism mounted on a tape deck 11 supported in a case 12.

A tape 13 is shown in position for transport between a pair of reels 14 and 15. The tape 13 is trained around a pair of idlers 16 and 17, so as to pass transversely across the central portion of the tape deck 11. In its transverse travel, the tape 13 passes in front of two playback (or recording) heads 18 and 19. On the opposite side of the tape 13 from each recording head is a tiltable pressure pad **18*a*, and 19*a*, respectively. The tape 13** is pressed into playing position by one of the tiltable pressure pads for each direction of tape travel.

The tape 13 is pulled from one reel to the other by a drive to be described hereinafter. In addition, a retractable tension idler 20 presses the tape into engagement with a tension shaft 21, which is driven in the proper direction to co-act with the take-up pulley for the particular direction of tape movement.

It will be appreciated that only one of the two playback heads 18 and 19 is in operation at one time. The two tiltable pressure pads **18*a* and 19*a* are both tilted away from the playback heads 18 and 19** when the machine is at rest, or when the tape is being reversed at high speed. When the tape is moving under playback conditions, one tiltable head will always be in a tilted position while the other is pressed against an engaged playback head.

The tape player 10 is operated by means of simple controls at the visible end, including a combination on-off switch and a volume control 22, and a shifting lever 23, which starts the tape playback in either direction, selectively, or disengages the drive and electrical system in a central shut-off position.

In addition, there is provided a disengaging lever 24 to permit rapid rewind, as will be described hereinafter.

Two persons may listen to the tape player by means of separate earphones, each plugged into the tape player at one of the two receptacles 25 and 26.

Preferably, the tape player is a transistorized device and is capable of operation on very low power. The electric storage battery power source is shown at 27.

The case 12 may be closed by means of the lid **12*a*, and the tape player may be carried in the hand or slung from the shoulder by a strap, as it is transported during use. As will be seen from the following description of its interior construction, it is capable of stable and continuous operation in any position, and the tape deck is referred to as having an upper reel surface and an underside only for convenience in description, since the device will operate perfectly in an inverted position. To facilitate inverted operation, the reels 14 and 15 are tightly received on reel-receiving hubs 14*a* and 15*a***.

In the enlarged perspective view of FIGURE 2, the reels 14 and 15 have been removed, the tape deck 11 has been partially broken away and idler 16 and tension pulley 20 have been removed in order to show the principal tape direction shifting elements, and the drive mechanism. Also, it will be noted that playback head 18 has been removed, and tiltable pressure pads **18*a* and 19*a*** are shown in an engaged and retracted position, respectively, instead of vice versa as in FIGURE 1. Also, part of the drive belting and shifting mechanism have been omitted or broken away for purposes of clearer illustration.

It will be seen from FIGURE 2 and FIGURE 4 that the tension shaft 21 is rotatably mounted in the tape deck 11 and is driven by a speed reduction pulley 28 of large diameter. The reel-receiving hooks **14*a* and 15*a* rotate integrally with shafts 31 and 32, respectively, which are likewise rotatably mounted in tape deck 11, as seen in FIGURE 4. However, the lower ends of shafts 31 and 32 carry clutch plates 33 and 34, instead of pulleys. Reel drive pulleys 35 and 36 are carried on shafts 31 and 32, but are not keyed thereto, and are free to rotate relative to the respective shafts, as well as to move axially therealong, to and from engagement with clutch plates 33 and 34. Reel driving pulleys 35 and 36 are both being continuously driven regardless of whether the tape 13 is being transported to reel 14 or reel 15, but only the pulley on the take-up reel is engaged, the other pulley being retracted into a free-wheeling position. Thus, in FIGURE 4, the selective shifting mechanism to be described hereinafter has depressed pulleys 36 into engagement with clutch wheel 34, and hub 15*a* is driven in take-up rotation, while pulley 35 is retracted upward away from clutch wheel 33, permitting hub 14*a* to rotate in the tape supply direction. The system of belt drives for speed reduction wheel 28 and reel driving pulleys 35 and 36 is best seen in the bottom plan view of FIGURE 3. A reversible electric motor 40 carries a main driving pulley 41 on stub staft 42. A main drive belt 28*a* is trained around main drive pulley 41, and a speed reduction pulley 28, one reach of belt 28*a* being directed around an aligning idler 43, which is rotatably mounted on a shaft 44. Shaft 44 is mounted to the underside of the tape deck 11, with its axis slightly tilted with respect to the plane of the tape deck 11 to provide minimum friction travel for belt 28*a* in alignment with main pulley 41. The bottom view of FIGURE 3 and the sectional view of FIGURE 4 show that the lower end of tension shaft 21 is journaled in a journal bracket bar 45 which is supported by bolts 46 and 47 from the underside of the tape deck 11**.

Rotating integrally with tension shaft 21 is a double groove pulley 48, which imparts driving rotation to both the reel pulleys 35 and 36 through reel pulley belts **35*a* and 36*a***, respectively.

It will be seen from the relative pulley sizes in FIGURE 3 that the pulley drive system of the specific embodiment serves as a means for a double step-down in motor speed; speed reduction pulley 28 is much larger in diameter than main drive pulley 41 and the motor 40, and the reel pulleys 35 and 36 are, in turn, substantially larger in diameter than the double groove pulley 48 on tension shaft 21.

The belting is an elastic rubber material, so that belts **35*a* and 36*a* both serve as retraction springs, continuously exerting a slight retracting force on reel pulleys 35 and 36, to lift them clear of their respective clutch wheels 33 and 34** except when one of them is selectively depressed into clutch engaging position by the selective shifting means to be described hereinafter.

FIGURE 3 also illustrates electrical and electronic components of the tape player. The battery 27 is connected to a two-way switch 50 by means of lines 51 and 52. Two-way switch 50 has an operating lever 53 which is normally in a central shut-off position, but which can be selectively deflected to a right or left position by a pair of switch engaging fingers 54 and 55 carried on a reversing slide means to be described hereinafter. When the switch lever 53 is deflected, the motor 40 is energized and driven in one direction or the other depending on the direction of deflection of lever 53. Regardless of which direction the switch lever is deflected, its deflection supplies power to the transistorized and printed circuit amplifier 60 by way of lines 61 and 62. Amplifier 60 is permanently connected to both pick-up heads 18 and 19, and will supply to earphones at earphone jacks 25 and 26 the signal detected on either of the tracks on tape 13, depending upon which of the pressure pads 18*a* or 19*a* is tilted forward to press tape 13 against this corresponding playback head.

The operation of shift lever 23 not only selectively controls reversing switch 50, and thereby the direction of tape movement, but it also selectively engages the clutch plate 33 or 34, and selectively places playback head 18 or 19 in operation by bringing into engagement the proper one of the pressure pads 18*a* and 19*a*.

FIGURES 5 and 6 show the principal mechanism controlled by the shift lever 23, a reversing slide 70 which is in the form of a metal plate slidably mounted on the undersurface 11*a* of the tape deck 11. Reversing slide 70 is retained closely but loosely against underside 11*a* by screws 71 and 72, the shanks of which pass through longitudinal slots 71*a* and 72*a* into undersurface 11*a*.

The reversing slide is seen from above with the tape deck 11 broken away, in FIGURE 2, part of the slide 70 being broken away in order to reveal reel pulley 36.

As best viewed in FIGURES 2 and 6, reversing slide 70 is caused to slide from one position to another by shifting shift lever 23. Lever 23 is pivotally attached to the undersurface of tape deck 11 by means of shift lever pivot screw 73. The lever 23 is in the form of a right angle crank with a slide engaging arm 74 having its end received in movable engagement with a rocking notch 75 in the side of reversing slide 70. The underside of shift lever 23 is provided with a locating pin 76 which is adapted to be received in any one of the three locating notches 77, 78, or 79 in locating latch bar 80. Latch bar 80 is pivotally attached to the undersurface 11*a* of tape deck 11 by means of a latch bar pivot screw 81, and the latch bar 80 is resiliently urged into engagement with locating pin 76 by means of a helical spring 82 which is anchored at 83 to undersurface 11*a*.

FIGURES 5 and 6 reveal that reversing slide 70 not only transports the switch operating fingers 54 and 55, but also a pair of clutch operating fingers 84 and 85. Thus, when the shift lever 23 is rocked to the A position as indicated by the arrow 90 in FIGURE 7, the clutch operating finger 84 is transported into sliding engagement with the conical upper surface of reel driving pulley 36, as seen in FIGURE 4, so that reel 15*a* becomes the take-up reel. Simultaneously, movement of the slide 70 to the right withdraws the left clutch operating finger from the immediate vicinity of reel pulley 35, allowing it to be raised by the resilient tension in its belt 35*a*, so that it is not engaged by clutch wheel 33, which is caused to rotate by the unwinding of tape from reel 14 on reel hub 14*a*.

In addition to switch operating fingers 54 and 55, and clutch operating fingers 84 and 85, the reversing slide 70 carries a pressure pad operating latch 91, seen in perspective from above in FIGURE 2, and in inverted position in FIGURE 5. The latch 91 has a longitudinal slot 92 with shoulders 93 and 94 for engaging, respectively, tension pulley lever 111, and tension pulley lever 112.

The tension pulley 20 rotates integrally with a tension pulley shaft 20*a* (see FIGURE 2), which is carried on a second slidable plate, tension pulley slide 100. Like reversing slide 70, with which its movement is parallel, tension pulley slide 100 is held in slidable relationship with the undersurface of the tape deck 11 by means of a screw 101 which passes through a longitudinal slot 102 in tension pulley slide 100. However, whereas, as viewed in FIGURES 7 and 8, reversing slide 70 must move to the right for a shift to position A, and to the left for a shift to position B, tension pulley slide 100 must move to the right in both instances.

Simultaneously with the operation of tension pulley slide 100, pressure pad 19*a* must be rocked into playback position for position A, or pressure pad 18*a* must be rocked into playback position for a shift to shifting lever position B, the disposition of parts being shown for these two positions in FIGURES 7 and 8, respectively.

As seen in FIGURE 6, both pressure pads 18*a* and 19*a* are provided with retracting springs 103 and 104 so that they are both held in retracted (non-playback position) unless forced to move into playback position against one of the playback heads 18 or 19.

The movement of the proper pressure pad and the transport of tension pulley slide 100 are simultaneously accomplished as illustrated in FIGURES 6, 7, and 8.

FIGURE 6 shows the slides 70 and 100 at rest position, with the shift lever 23 at the central position C. Note that the reversing slide 70 is located with its supporting screws 71 and 72 midway in their slots 71*a* and 72*a*. The tension pulley slide 100 is held in its normal rest position, all the way to the left, by a tension pulley slide spring 106 which is anchored to the undersurface 11*a* of tape deck 11 by anchoring screw 107. Note also that the tension pulley shaft 20*a* is located in the left end of a slotted opening 108 in tape deck 11.

As seen from FIGURES 2 and 6, the pressure pads 18*a* and 19*a* have rocker arms 18*b* and 19*b* which extend through rocker arm openings 18*c* and 19*c* in tape deck 11 (see FIGURE 6). The pressure pads 18*a* and 19*a* are adapted to rock between engaged and retracted positions about rocker arm shafts 18*d* and 19*d*, being held in normally retracted position by the springs 103 and 104, as already mentioned.

Reversing slide 70 carries a resilient spring wire pressure pad finger 110, which nearly touches rocker arm 18*b* in the rest position of FIGURE 6.

When the operating and shifting lever 23 is moved to position A as illustrated in FIGURE 7, the reversing slide 70 moves to the right as illustrated in both FIGURES 2 and 7, and the pressure pad operating finger 110 causes the pressure pad 18*a* to rock into upright position, thus engaging the tape with playback head 18, and causing pick-up at that head. Reversing slide 70 is moved to the right as indicated by the arrow 70*a*, tension pulley slide is moved to the right as indicated by the arrow 100*a*, and clutch wheels 33 and 34, together with their associated shafts 31 and 32 are caused to rotate as indicated. Switch finger 54 engages switch lever 53 driving tension pulley 21 as indicated by the arrow 21*a*. Take-up reel driving is imposed on reel 15 by the operation of clutch engaging finger 84.

It will be understood that the tension pulley 20 is merely an idler which rotates freely on a stationary stub shaft 20*a*. The stub shaft 20*a* projects downwardly a short distance below the tension idler slide 100, in which it is mounted, and provides a convenient means of attachment for a stiff but resilient transverse operating bar 111. In FIGURE 7, the operator bar 111 is moved to the right together with tension idler slide 100 by engagement with the shoulder 93 of the latch member 91.

When the shifting lever 23 is shifted to the reverse drive position B, illustrated in FIGURE 8, the reversing slide 70 shifts all the way to the left as indicated by the arrow 70*b*, and the two reel shafts 31 and 32 rotate in directions opposite to that of FIGURE 7, as indicated by the arrows 31b and 32b. The switch lever 53 has been rocked to a reverse position by switch finger 55. The clutch finger 84 has disengaged from reel pulley 36 while the clutch finger 85 has now engaged reel pulley 35, depressing it into driving position.

Shoulder 94, at the opposite end of latch 91, now operates a lever 112, which is pivotally mounted by pivot screw 113 in the undersurface of the tape deck 11. The swinging end 114 of lever 112 pulls the rocker arm 19b, by means of a spring connection 115, so as to rock pressure pad 19a into playback position.

The swinging end 114 of the lever 112 carries a pull arm 116 which passes through and freely slides in an eye member 117 in the end of transverse tension idler bar 111. The end of the pull bar 116 is provided with a hook 118 which engages ring 117 as lever 112 swings in the manner illustrated in FIGURE 8, thus transporting the tension idler slide 100 to the right in the direction of the arrow 100a.

It will be seen from FIGURES 7 and 8 that the tension shaft 21 is turned in the direction indicated by the arrow 21a in FIGURE 7, and in the direction indicated by the arrow 21b in FIGURE 8. In both cases, the tension pulley or tension idler 20 presses the tape 13 against the tension shaft 21 and holds the tape under a slight tension as it moves past the recording head 19.

It will be understood that the reversing switch 50 not only reverses the direction of the current through the motor 40, but also selectively connects only one of the playback heads 18 or 19 to the amplifier 60, so that only the sound from the desired tape track is reproduced in earphones connected to the output of the amplifier at earphone connections 25 and 26.

It will be noted that tension shaft 21 provides a uniform tape speed during playback, regardless of the slight variation in speed at which the tape is wound on the take-up reel, as a result of the increasing diameter of tape wound on the reel.

A minor refinement in the device is the provision for lifting latch member 91 so as to disengage both the tension idler bar 111 and the pressure pad operating lever 112. It will be seen from FIGURE 5 that the latch member 91 is rotatable about axially aligned pins 120 and 121, by which each of its ends is mounted in latch mounting supports 122 and 123 which project from the underside of reversing slide 70. When it is desired to rapidly rewind the tape from one reel to the other, without moving tension idler slide 100, and without engaging either pressure pads 18a or 19a, the lever 24 is rotated downwardly, as viewed in FIGURE 2, causing its arm 130 to force the latch member 91 downward and away from the underside of reversing slide 70, against the resilient pressure of pressure pad finger 110, which ordinarily holds the latch member 91 in normally operating position. The downward displacement of latch member 91 releases idler slide bar 111 and lever 112 from engagement with the shoulders 93 and 94, so that the shift lever 23 may be moved into either A or B position without bringing the idler pulley or either the playback heads into operation.

In the second illustrated embodiment, shown in FIGURES 9 to 19, there are many parts which correspond almost exactly to the parts already described in connection with the first embodiment, illustrated in FIGURES 1 to 8 inclusive. Where the parts are substantially identical, the same numeral as that already used in FIGURES 1 to 8 will be employed, but with a lower case b appended. Parts of the second embodiment which are not substantially identical with the embodiment of FIGURES 1 to 8 will be identified by numerals in the range 200 to 299.

In FIGURE 9, the tape player indicated generally by the numeral 200 is seen to have its tape transport mechanism mounted on a tape deck 11b with a tape 13b shown in position for transport between a pair of reels 14b and 15b.

The entire tape player is housed in lower housing 201 and upper housing 202, the latter being shown unscrewed and lifted away to reveal tape deck 11b. The tape deck 11b is nestably supported in and screwed to lower housing 201.

As in the first embodiment, the tape 13b is trained around a pair of idlers 16b and 17b so as to pass transversely across the central portion of the tape deck 11b. In its transverse travel, the tape 13b passes in front of two recording heads 18b and 19b. On the opposite side of the tape 13b from the recording heads 18b and 19b is a pressure pad arm 203, which carries pressure pads 18ab and 19ab at its respective ends. Pressure pad arm 203 is mounted on a vertical shaft 204 which may be rotated about its axis, in a manner to be described hereinafter, to selectively rotate either pressure pad 18ab or 19ab into playback position against its adjacent playback head.

In FIGURE 9, the tape player 200 is seen from the upper left front. A vertical front panel 205 is formed out of the same metal plate which comprises tape deck 11b. Front panel 205, and the controls thereon, are exposed to the user, even after tape deck 11b is covered by assembly of upper housing 202 to lower housing 201.

An off-on control lever 206 is shown in the "off" position, and is movable in slotted opening 207. Volume control is achieved by means of a volume control wheel 208.

Two persons may listen to the tape player by means of separate earphones, each plugged into the tape player at one of the two receptacles 25b and 26b. A battery-charging receptacle is provided at 209.

As in the case of the first embodiment, the device will operate perfectly in an inverted position; to facilitate inverted operation, the reels 14b and 15b are tightly received on reel hubs 14ab and 15ab, respectively.

The bottom plan view of FIGURE 10 corresponds to the bottom plan view of the first embodiment, illustrated in FIGURE 3, and has many features in common. As in the first embodiment, a speed reduction pulley of large diameter 28b is driven by a motor 40b by means of a belt 28ab, which is trained around main driving pulley 41b, aligning idler 43b, and speed reduction pulley 28b.

A battery 27b supplies power for motor 40b, and also for the printed circuit amplifier 60b.

The speed reduction pulley 28b is integrally mounted on a tension shaft 21b, the lower end of which is journaled in a journal bracket bar 45b.

As in the first embodiment, the reels 14b and 15b are driven by engaging either reel drive pulley 35b or 36b (seen in FIGURE 11) with clutch plates 33b or 34b, respectively, which are mounted and keyed to the lower ends of shafts 31b and 32b.

In the enlarged perspective view of FIGURE 11, the reels 14b and 15b have been removed, the tape deck 11b has been partially broken away, the right playback head 19b and the right idler 17b have been removed, all in order to show the principal shifting and off-on mechanism.

The perspective views of FIGURES 11 and 12 may be described jointly, although FIGURE 11 is a view from the upper left rear, and FIGURE 12 is a view from the upper right front, diagonally opposite FIGURE 11. The direction of tape travel is indicated in FIGURES 11 and 12, and in subsequent figures by an arrow A or B, direction A being for travel of the tape toward the front panel 205, when reel 15b is being driven and reel 14b is being dragged; and direction B indicating tape travel toward the rear of the machine, when reel 14b is being driven, and reel 15b is dragging. As indicated by the legend, "on" and "off" in FIGURES 11 and 12, respectively, the lever 206, and the tape player mechanism are disposed in the "on" and "off" positions, respectively, in the two FIGURES.

Tape reversal is accomplished by shifting a reversing slide 70b, corresponding to slide 70 in the first embodiment of the invention, but having a slightly different construction.

The tape player 200 is turned "on" or "off" when the control lever is shifted between its two positions, illussion pulley slide 100b, which has as its principal function the transport of the tension idler shaft 20ab. Thus, as in the first embodiment, the tension pulley idler 20b can be shifted toward the front panel 205, with the forward movement of tension pulley slide 100b to the "on" positrated in FIGURES 11 and 12, by the shifting of a tention, illustrated in FIGURE 11, so as to pinch the tape 13b between the tension pulley idler 20b and the rotating tension shaft 21b, which carries the large speed reduction wheel 28b at its lower end.

The bottom plan view of FIGURE 13 and its related vertical sectional view FIGURE 14 reveal that the two slides 70b and 100b are slidably mounted to the undersurface of the tape deck 11b by screws passing through longitudinal slots, screws 71b and 72b for reversing slide 70b, and screws 101b for tension idler slide 100b.

The tape deck 11b is slotted at 108b to accommodate the longitudinal travel of idler pulley shaft 20ab.

Since the tape player is most likely to be used on a rental basis, it is convenient to provide it with a counter for recording the number of tape reversals. A counter 212 is mounted to the underside of the tape deck 11b. It is mechanically advanced by the engagement of a ratchet 213 by a pawl 214 each time reversing slide 70b is shifted to the B direction, as seen in the plan view of FIGURE 13.

The perspective view of FIGURE 15 shows the shifting lever 220 and the key 221 by means of which shifting lever 220 can be rotated counter clockwise to the B position illustrated in FIGURES 13 and 14, or clockwise to position A, illustrated in bottom plan views of FIGURES 16 and 17.

FIGURES 12 and 15 reveal that reversing lever 220 projects radially from its own shaft of rotation 222, and transports reversing slide 70b by engaging either of two dogs 223 or 224, which project downwardly from the side of the slide 70b.

The pressure pad arm 203 is also shifted by the movement of reversing slide 70b. The vertical shaft 204, upon which the pressure pad arm 203 is mounted, is rotated through a part turn in either direction by a pressure pad lever 225, which has its swinging end between the dogs 223 and 224, as seen in the bottom plan views of FIGURES 13 and 16.

The reversing slide 70b actuates, selectively, one of a pair of reel-driving clutches in the same manner as has already been described in connection with the first embodiment, illustrated in FIGURES 1 to 8. Thus, the front reel shaft 31b is driven when the reel pulley 35b is depressed into engagement with the clutch disc 33b by clutch finger 85b, when reversing slide 70b is shifted forward to the A position, as illustrated in FIGURES 11, 12, 16, and 17. On the other hand, when reversing slide 70b is shifted rearwardly to the B position, clutch finger 84b depresses reel pulley 36b into driving engagement with clutch wheel 34b, thus driving reel 14b, as illustrated in FIGURES 13 and 14.

As illustrated in the perspective view of FIGURE 18, the clutching faces of pulley 36b and clutch wheel 34b have been constructed to provide a positive drive. Reel 36b is provided with a pair of semi-circular spiral surfaces 231 and 232, which terminate in shoulders 233 and 234. Mating shoulders 235 and 236 are provided on the clutch wheel 34b. Pulley 35b and clutch wheel 33b are identically constructed.

Exactly as in the case of the first embodiment of the invention (FIGURES 1 to 8), both reel pulleys 35b and 36b are constantly rotating while the tape player 200 is operating. Both are driven by a double pulley 48b on tension shaft 21b (see FIGURE 14) by a pair of belts 35ab and 36ab (see FIGURE 16).

The pulleys 36b and 35b rotate freely on stationary sleeves 237 and 238, so that no motion can be transmitted from the continuously rotating pulley to the reel shaft, except during clutch engagement.

As in the case of the first embodiment, the belts 35ab and 36ab have sufficient resilience so as to urge reels 36b and 35b out of clutching engagement, except when urged into clutching by one of the clutch fingers 84b or 85b.

Reversing slide 70b also carries a pair of drag pads 240 and 241 (best seen in FIGURE 12), for dragging the non-driven clutch wheel.

The proper playback head, of playback heads 18b and 19b, is connected to amplifier 60b by a head selecting switch 245. The head selecting switch 245 is a single pole, double-throw, leaf switch, which normally connects the head for B direction play, as in FIGURE 13, but is deflected to connection for A direction play, as illustrated in FIGURES 16 and 17, when reversing slide 70b is shifted to the A position. Deflection is accomplished by means of a head selecting switch operating finger 246 carried on reversing slide 70b.

At the same time, the motor is reversed by the motor reversing switch 250, from its normal B position (illustrated in FIGURE 13) to its deflected A position (illustrated in FIGURES 16 and 17) by motor reversing switch finger 251, carried on reversing slide 70b.

The tension pulley slide 100b, which also may be characterized as an "on-off" slide is positively located by two-position cam 260 and its associated spring 261. Two-position cam 260 is shifted by the operator by means of the operating lever 206, between an "on" position as illustrated in FIGURES 11, 13, and 17, or an "off" position as illustrated in FIGURES 12 and 16. The action is one of snapping positively into one or two positions by virtue of over-the-center spring movement of the cam spring 261, which resiliently pulls tension pulley slide 100b into contact with one of the two flat cam surfaces 262 or 263.

The slide 100b is slightly nearer the front panel 205 of the tape player 200 when in the "on" position. When the cam 260 is shifted to the "off" position, as illustrated in FIGURE 12, the slide 100b is displaced rearward with respect to front panel 205, and two brake pads 270 and 271 are urged against the clutch wheels 34b and 33b, respectively, as illustrated in the side elevational view of FIGURE 19.

At the same time, as illustrated in FIGURE 16, an "on-off" leaf switch 280 is deflected to the "off" position by an "on-off" switch finger 281 projecting from the side of tension pulley slide 100b.

Although the invention has been herein shown and described in what is conceived to be two of the most practical specific embodiments, it is recognized that departures may be made from these within the scope of the invention, which is not to be limited to the embodiments disclosed herein, but is to be accorded the full scope of the claims so as to embrace any and all equivalent structures.

For example, it will be appreciated that the invention is not necessarily restricted to magnetic tape recordings, but may be employed with any type of tape record which is capable of being played back on lightweight equipment. Also, it will be understood that the proportions and dimensions of the parts shown, and that the particular types of linkages, levers, and clutch engagements are by way of practical and specific example only; but the same principles of reversing slide carrying switch means, clutch engaging means, and playback connection means in combination with a slide moving in one direction only, might be achieved with many obvious variations on the particular detailed mechanical constructions illustrated.

What is claimed is:

1. A reversible tape player which includes: a tape deck having an upper surface for mounting tape reels and an under surface for mounting a reversing slide for the control of said tape player; first and second tape reel shafts rotatably mounted in said tape deck; first and second tape reels mounted on said first and second reel shafts; first and second tape playback heads mounted on said tape deck in the path of tape transported between said first and second reels; a reversing slide slidably mounted on the underside of said tape deck to be slidably transported to a first reel driving position, a second reel driving position, a shut-off position; means for shifting said reversing slide selectively to any one of its three positions; first and second clutch means for driving said first and second reel shafts; reversible motor and drive mechanism means for driving at least one of said clutch means; clutch operating means carried on said reversing slide for engaging said first clutch means when said slide is in said first reel drive position and for engaging said second clutch means when said reversing slide is in the second reel drive position; amplifier means for converting signals from either of said first and second playback heads to audible signals; a reversing switch controlled by said reversing slide for controlling an electric motor drive means; said electric motor drive means driving said shaft drive mechanism reversibly in first or second direction; reversible electric relay means to drive said tape in one direction and simultaneously connecting one of said playback heads to said amplifier means; and relay operating means on said reversing slide for selectively operating said reversing switch in said first or second directions, when said slide is shifted to said first or second positions.

2. A reversible tape player which includes: a tape deck having an upper surface for mounting tape reels and an undersurface for mounting a reversing slide for the control of said tape player; first and second tape reel shafts rotatably mounted in said tape deck; first and second tape reels mounted on said first and second reel shafts; first and second tape playback heads mounted on said tape deck in the path of tape transported between said first and second reels; first and second playback actuator means associated with said first and second playback heads, each of said actuator means being mounted movably to be shifted between a play position and a no-play position, a reversing slide slidably mounted on the underside of said tape deck and slidably locatable at a first reel-driving position, a second reel-driving position, or a shut-off position; means for shifting said reversing slide selectively to any one of its three positions; first and second clutch means for driving said first and second reel shafts; shaft drive mechanism means for selectively driving at least one of said clutch means; clutch engaging means carried on said reversing slide for engaging said first clutch means when said slide is in the first reel-driving position and for engaging said second clutch means when said reversing slide is in the second reel-driving position; actuator shifting means carried on said reversing slide for moving said first actuator means, said first pressure pad operating into play position with said first playback head when said slide is moved to said first reel-driving position and said second actuator means into play position with said second playback head when said reversing slide is shifted to said second reel-driving position; amplifier means for converting signals from either of said first and second playback heads to audible signals; a reversing switch controlled by said reversing slide for controlling an electric motor drive means; said electric motor drive means driving said shaft drive mechanism reversibly in either direction depending on the passage of current through said electrical motor means; reversible electric relay means for selectively connecting said motor means to drive said tape in one direction and simultaneously connecting one of said playback heads to said amplifier means; and relay operating means on said reversing slide for selectively operating said reversing switch in said first or second directions, when said slide is shifted to said first or second positions.

3. A reversible tape player which includes: a tape deck having an upper surface for mounting tape reels and an undersurface for mounting a reversing slide for the control of said tape player; a tension shaft rotatably mounted in a central portion of said tape deck; first and second tape reel shafts rotatably mounted in said tape deck and spaced in a line with said tension shaft on opposite sides thereof; first and second tape reels mounted on said first and second reel shafts; a tape path idler means for leading a tape along between said first and second reels and (in contact with) said tension shaft; first and second tape playback heads mounted on said tape deck in the path of tape transported between said first and second reels, and located on opposite sides of said tension shaft with respect to the path of said tape; first and second pressure pad means adjacent said first and second playback heads, each of said pressure pad means being mounted movably to be shifted between a play position adjacent its playback head, and retracted into a no-play position spaced from said playback head; first and second pressure pad arms extending below said tape deck from said first and second pressure pads to control the movement of said pads between their play and no-play positions, a reversing slide slidably mounted on the underside of said tape deck to slide between a first reel-driving position and a second reel-driving position with a shut-off position intermediate said first and second reel-driving positions; lever means for shifting said reversing slide selectively to any one of its three positions; first and second clutch means for driving said first and second reel shafts; transmission means for simultaneously driving said tension shaft and both said first and second clutch means; clutch engaging means carried on said reversing slide for engaging said first clutch means to drive said first reel shaft when said slide is in the first reel drive position and for engaging said second clutch means to drive said second reel shaft when said reversing slide is in the second reel drive position; pressure pad operating means carried on said reversing slide, and adapted to engage said first pressure pad in play position with said first playback head when said slide is moved to said first reel-driving position and to move said second pressure pad into play position with said second playback head when said reversing slide is shifted to said second reel-driving position; amplifier means for converting signals from either of said first and second playback heads to audible signals; a reversing switch controlled by said reversing slide for controlling an electric motor drive means; said electric motor drive means driving said transmission means reversibly in either direction depending on the passage of current through said electrical motor means; reversible electric relay means for selectively connecting said motor means to drive said tape in one direction and simultaneously connecting one of said playback heads to said amplifier means; and relay operating means on said reversing slide for selectively operating said reversing switch in said first or second directions, when said slide is shifted to said first or second positions.

4. A reversible tape player which includes: a tape deck having an upper surface for mounting tape reels and an undersurface for mounting a reversing slide for the control of said tape player; a tension shaft rotatably mounted in a central portion of said tape deck; first and second tape reel shafts rotatably mounted in said tape deck and spaced in a line with said tension shaft on opposite sides thereof; first and second tape reels mounted on said first and second reel shafts; a tape path idler means for leading a tape along between said first and second reels and (in past contact with) said tension shaft; first and second tape playback heads mounted on said tape deck in the path of tape transported between said first and second reels, and located on opposite sides of said tension shaft with respect to the path of said tape; first and second pressure pad means adjacent said first and second playback heads, each of said pressure pad means being mounted movably to be shifted between a play position adjacent its playback head, and retracted into a no-play position spaced from said playback head; first and second pressure pad arms extending below said tape deck from said first and second pressure pads to control the movement of said pads between their play and no-play positions; a reversing slide slidably mounted on the underside of said tape deck to slide between a first reel-driving position and a second reel-driving position with a shut-off position intermediate said first and second reel-driving positions; lever means for shifting said reversing slide selectively to any one of its three positions; first and second clutch means for driving said first and second reel shafts; transmission means for simultaneously driving said tension shaft and both said first and second clutch means; clutch engaging means carried on said reversing slide for engaging said first clutch means to drive said first reel shaft when said slide is in the first reel drive position and for engaging said second clutch means to drive said second reel shaft when said reversing slide is in the second reel drive position; pressure pad operating means carried on said reversing slide, and adapted to engage said first pressure pad in play position with said first playback head when said slide is moved to said first reel-driving position and to move said second pressure pad into play position with said second playback head when said reversing slide is shifted to said second reel-driving position; a tension idler slide slidably mounted on the underside of said tape deck and movable between a shut-off position and an operating position; a tension idler shaft projecting through a slot in said tape deck; a tension idler rotatably mounted on said tension idler shaft and adapted to press tape into contact with said tension shaft when said tension idler slide is in operating position; tension idler slide actuating mechanism for moving said tension idler slide into operating position in response to movement of said reversing slide into either first or second reel-driving position; amplifier means for converting signals from either of said first and second playback heads to audible signals; a reversing switch controlled by said reversing slide for controlling an electric motor drive means; said electric motor drive means driving said transmission means reversibly in either direction depending on the passage of current through said electrical motor means; reversible electric relay means for selectively connecting said motor means to drive said tape in one direction and simultaneously connecting one of said playback heads to said amplifier means; and relay operating means on said reversing slide for selectively operating said reversing switch in said first or second directions, when said slide is shifted to said first or second positions.

5. A reversible tape player which includes: a tape deck having an upper surface for mounting tape reels and an undersurface for mounting a reversing slide for the control of said tape player; a tension shaft rotatably mounted in a central portion of said tape deck; first and second tape reel shafts rotatably mounted in said tape deck and spaced in a line with said tension shaft on opposite sides thereof; first and second tape reels mounted on said first and second reel shafts; a tape path idler means for leading a tape along between said first and second reels and (in past contact with) said tension shaft; first and second tape playback heads mounted on said tape deck in the path of tape transported between said first and second reels, and located on opposite sides of said tension shaft with respect to the path of said tape; first and second pressure pad means adjacent said first and second playback heads, each of said pressure pad means being mounted movably to be shifted between a play position adjacent its playback head, and retracted into a no-play position spaced from said playback head; first and second pressure pad arms extending below said tape deck from said first and second pressure pads to control the movement of said pads between their play and no-play positions; a reversing slide slidably mounted on the underside of said tape deck to slide between a first reel-driving poistion and a second reel-driving position with a shut-off poistion intermediate said first and second reel-driving positions; lever means for shifting said reversing slide selectively to any one of its three positions; first and second clutch means for driving said first and second reel shafts; transmission means for simultaneously driving said tension shaft and both said first and second clutch means; clutch engaging means carried on said reversing slide for engaging said first clutch means to drive said first reel shaft when said slide is in the first reel drive position and for engaging said second clutch means to drive said second reel shaft when said reversing slide is in the second reel drive position; pressure pad operating means carried on said reversing slide, and adapted to engage said first pressure pad in play position with said first playback head when said slide is moved to said first reel-driving position with said second playback head when said reversing slide is shifted to said second reel-driving position; a tension idler slide slidably mounted on the underside of said tape deck and movable between a shut-off position and an operating position; a tension idler shaft projecting through a slot in said tape deck; a tension idler rotatably mounted on said tension idler shaft and adapted to press tape into contact with said tension shaft when said tension idler slide is in operating position; tension idler slide actuating mechanism for moving said tension idler slide into operating position in response to movement of said reversing slide into either first or second reel-driving position; latch means on said reversing slide for disengaging said pressure pad operating means for rewinding; amplifier means for converting signals from either of said first and second playback heads to audible signals; a reversing switch controlled by said reversing slide for controlling an electric motor drive means; said electric motor drive means driving said transmission means reversibly in either direction depending on the passage of current through said electrical motor means; reversible electric relay means for selectively connecting said motor means to drive said tape in one direction and simultaneously connecting one of said playback heads to said amplifier means; and relay operating means on said reversing slide for selectively operating said reversing switch in said first or second directions, when said slide is shifted to said first or second positions.

6. A reversible tape player which includes: a tape deck having an upper surface for mounting tape reels and an undersurface for mounting a reversing slide for the control of said tape player; a tension shaft rotatably mounted in a central portion of said tape deck; first and second tape reel shafts rotatably mounted in said tape deck and spaced in a line with said tension shaft on opposite sides thereof; first and second tape reels mounted on said first and second reel shafts; idler means for leading a tape along a tape path between said first and second reels and past said tension shaft; first and second tape playback heads mounted on said tape deck to the path of tape transported between said first and second reels, and located on opposite sides of said tension shaft with respect to the path of said tape; first and second pressure pad means adjacent said first and second playback heads, each of said pressure pad means being mounted movably to be shifted between a play position adjacent its playback head, and retracted into a no-play position spaced from said playback head; first and second pressure pad arms extending below said tape deck from said first and second pressure pads to control the movement of said pads between their play and no-play positions; a reversing slide slidably mounted on the underside of said tape deck to slide between a first reel-driving position and a second reel-driving position with a shut-off position intermeidate said first and second reel-driving positions; lever means for shifting said reversing slide selectively to any one of its three positions; first and second clutch means for driving said first and second reel shafts; transmission means for simultaneously driving said tension shaft and both said first and second clutch means; first and second clutch fingers carried on said reversing slide for engaging said first clutch means to drive said first reel shaft when said slide is in the first reel drive position and for engaging said second clutch means to drive said second reel shaft when said reversing slide is in the second reel drive position; first and second pressure pad operating means carried on said reversing slide, said first pressure pad operating means adapted to engage said first pressure pad in play position with said first playback head when said slide is moved to first reel drive position and said second pressure pad into play position with said second playback head when said reversing slide is shifted to second reel drive position; retracting means for retracting both of said pressure pads into no-play position except when actuated by said pressure pad actuating means; amplifier means for converting signals from either of said first and second playback heads to audible signals; a reversing switch controlled by said reversing slide for controlling an electric motor drive means; said electric motor drive means driving said transmission means reversibly in either direction depending on the direction of current through said electrical motor means; reversible electric relay means for selectively connecting said motor means to drive said tape in one direction and simultaneously connecting one of said playback heads to said amplifier means; and relay operating means on said reversing slide for selectively operating said reversing switch in said first or second directions, when said slide is shifted to said first or second positions.

7. A reversible tape player which includes: a tape deck having an upper surface for mounting tape reels and an undersurface for mounting a reversing slide for the control of said tape player; a tension shaft rotatably mounted in a central portion of said tape deck; first and second tape reel shafts rotatably mounted in said tape deck and spaced in a line with said tension shaft on opposite sides thereof; first and second tape reels mounted on said first and second reel shafts; idler means for leading a tape along a tape path between said first and second reels and past said tension shaft; first and second tape playback heads mounted on said tape deck in the path of tape transported between said first and second reels, and located on opposite sides of said tension shaft with respect to the path of said tape; first and second pressure pad means adjacent said first and second playback heads, each of said pressure pad means being mounted movably to be shifted between a play position adjacent its playback head, and retracted into a no-play position spaced from said playback head; first and second pressure pad arms extending below said tape deck from said first and second pressure pads to control the movement of said pads between their play and no-play positions; a reversing slide slidably mounted on the underside of said tape deck to slide between a first reel-driving position and a second reel-driving position with a shut-off position intermediate said first and second reel-driving positions; lever means for shifting said reversing slide selectively to any one of its three positions; first and second clutch means for driving said first and second reel shafts; transmission means for simultaneously driving said tension shaft and both said first and second clutch means; first and second clutch fingers carried on said reversing slide for engaging said first clutch means to drive said first reel shaft when said slide is in the first reel drive position and for engaging said second clutch means to drive said second reel shaft when said reversing slide is in the second reel drive position; first and second pressure pad operating means carried on said reversing, slide said first pressure pad operating means adapted to engage said first pressure pad in play position with said first playback head when said slide is moved to first reel drive position and said second pressure pad into play position with said second playback head when said reversing slide is shifted to second reel drive position; retracting means for retracting both of said pressure pads into no-play position except when actuated by said pressure pad actuating means, a tension idler slide slidably mounted on the underside of said tape deck and movable between a shut-off position and an operating position; a tension idler shaft projecting through a slot in said tape deck; a tension idler rotatably mounted on said tension idler shaft and adapted to press tape into contact with said tension shaft when said tension idler slide is in operating position; tension idler slide actuating mechanism for moving said tension idler slide into operating position in response to movement of said reversing slide into either first or second reel-driving position; amplifier means for converting signals from either of said first and second playback heads to audible signals; a reversing switch controlled by said reversing slide for controlling an electric motor drive means; said electric motor drive means driving said transmission means reversibly in either direction depending on the direction of current through said electrical motor means; reversible electric relay means for selectively connecting said motor means to drive said tape in one direction and simultaneously connecting one of said playback heads to said amplifier means; and relay operating means on said reversing slide for selectively operating said reversing switch in said first or second directions, when said slide is shifted to said first or second positions.

8. A reversible tape player which includes: a tape deck having an upper surface for mounting tape reels and an undersurface for mounting a reversing slide for the control of said tape player; a tension shaft rotatably mounted in a central portion of said tape deck; first and second tape reel shafts rotatably mounted in said tape deck and spaced in a line with said tension shaft on opposite sides thereof; first and second tape reels mounted on said first and second reel shafts; idler means for leading a tape along a tape path from said first to said second tape reel, said tape path being transverse to the line between said tape reel shafts in the vicinity of said tension shaft; first and second tape playback heads mounted on said tape deck in the path of tape transported between said first and second reels, and located on opposite sides of said tension shaft with respect to the path of said tape; first and second pressure pad means adjacent said first and second playback heads, each of said pressure pad means being mounted movably to be shifted between a play position adjacent its playback head, and retracted into a no-play position spaced from said playback head; first and second pressure pad arms extending below said tape deck from said first and second pressure pads to control the movement of said pads between their play and no-play positions; a reversing slide slidably mounted on the underside of said tape deck to slide between a first reel-driving position and a second reel-driving position with a shut-off position intermediate said first and second reel drive positions; lever means for shifting said reversing slide selectively to any one of its three positions; first and second clutch means for driving said first and second reel shafts; speed reduction pulley means on said tension shaft under said tape deck; transmission means from said speed reduction pulley means for simultaneously driving both said first and second clutch means; first and second clutch fingers carried on said reversing slide for engaging said first clutch means to drive said first reel shaft when said slide is in the first reel drive position and for engaging said second clutch means to drive said second reel shaft when said reversing slide is in the second reel drive position; first and second pressure pad operating means carried on said reversing slide, said first pressure pad operating means adapted to engage said first pressure pad operating position with said first playback head when said slide is moved to first reel drive position and said second pressure pad operating means adapted to move said second pressure pad into play position with said second playback head when said reversing slide is shifted to second reel drive position; retracting means for retracting both of said pressure pads into no-play position except when actuated by said pressure pad actuating means; amplifier means for converting signals from either of said first and second playback heads to audible signals; a reversing switch controlled by said reversing slide for controlling an electric motor drive means; said electric motor drive means driving said speed reduction pulley means reversibly in either direction depending on the direction of current through said electrical motor means; reversible electric relay means for selectively connecting said motor means to drive said tape in one direction and simultaneously connecting one of said playback heads to said amplifier means; and relay operating means on said reversing switch in said first or second directions, when said slide is shifted to said first or second positions.

9. A reversible tape player which includes: a tape deck having an upper surface for mounting tape reels and an undersurface for mounting a reversing slide for the control of said tape player; a tension shaft rotatably mountted in a central portion of said tape deck; first and second tape reel shafts rotatably mounted in said tape deck and spaced in a line with said tension shaft on opposite sides thereof; first and second tape reels mounted on said first and second reel shafts; idler means for leading a tape along a tape path from said first to said second tape reel, said tape path being transverse to the line between said tape reel shafts in the vicinity of said tension shaft; first and second tape playback heads mounted on said tape deck in the path of tape transported between said first and second reels, and located on opposite sides of said tension shaft with respect to the path of said tape; first and second pressure pad means adjacent said first and second playback heads, each of said pressure pad means being mounted movably to be shifted between a play position adjacent its playback head, and retracted into a no-play position spaced from said playback head; first and second pressure pad arms extending below said tape deck from said first and second pressure pads to control the movement of said pads between their play and no-play positions; a reversing slide slidably mounted on the underside of said tape deck to slide between a first reel-driving position and a second reel-driving position with a shut-off position intermediate said first and second reel drive positions; lever means for shifting said reversing slide selectively to any of its three positions; first and second clutch means for driving said first and second reel shafts; speed reduction pulley means on said tension shaft under said tape deck; transmission means from said speed reduction pulley means for simultaneously driving both said first and second clutch means; first and second clutch fingers carried on said reversing slide for engaging said first clutch means to drive said first reel shaft when said slide is in the first reel drive position and for engaging said second clutch means to drive said second reel shaft when said reversing slide is in the second reel drive position; first and second pressure pad operating means carried on said reversing slide, said first pressure pad operating means adapted to engage said first pressure pad in play position with said first playback head when said slide is moved to first reel drive position and said second pressure pad operating means adapted to move said second pressure pad into play position with said second playback head when said reversing slide is shifted to second reel drive position; retracting means for retracting both of said pressure pads into no-play position except when actuated by said pressure pad actuating means; a tension idler slide slidably mounted on the underside of said tape deck and movable between a shut-off position and an operating position; a tension idler shaft projecting through a slot in said tape deck; a tension idler rotatably mounted on said tension idler shaft and adapted to press tape into contact with said tension shaft when said tension idler slide is in operating position; tension idler slide actuating mechansm for moving said tension idler slide into operating position in response to movement of said reversing slide into either first or second reel-driving position; latch means on said reversing slide for disengaging said pressure pad operating means for rewinding; amplifier means for converting signals from either of said first and second playback heads to audible signals; a reversing switch controlled by said reversing slide for controlling an electric motor drive means; said electric motor drive means driving said speed reduction pulley means reversibly in either direction depending on the direction of current through said electrical motor means; reversible electric relay means for selectively connecting said motor means to drive said tape in one direction and simultaneously connecting one of said playback heads to said amplifier means, and relay operating means on said reversing slide for selectively operating said reversing switch in said first or second directions, when said slide is shifted to said first or second positions.

10. A reversible tape machine for selectively operating on either first or second tracks on a recording tape, depending on the direction of tape travel, which machine includes: a tape deck; first and second tape reels rotatably mounted on said tape deck; driving means for driving said first and second tape reels; first and second clutch means between said driving means and said first and second reels for selectively placing one of said first and second tape reels in engagement with said tape driving means; first and second tape paths; tape head means for selectively operating on either of said first and second tape paths; slide means slidably mounted in said tape machine to be slidably transported between a first reel driving position and a second reel driving position; means for selectively sliding said slide means to either of said positions; clutch operating means on said slide means for selectively engaging one of said first and second clutch means; and head selection means for selectively placing said head means in operation with one of said tape paths for each position of said slide means.

11. A reversible tape machine for selectively operating on either first or second tracks on a recording tape, depending on the direction of tape travel, which machine includes: a tape deck; first and second tape reels rotatably mounted on said tape deck; driving means for driving said first and second tape reels; first and second clutch means between said driving means and said first and second reels for selectively placing on of said first and second tape reels in engagement with said tape driving means; first and second tape paths; first and second head means for said first and second tape paths; first and second tape contact means, one for each of said tape paths for placing one of said tape paths in operating position, against one of said head means; switch means selectively contacting one of said first and second tape heads in electrical operation; slide means slidably mounted in said tape machine to be slidably transported between a first reel driving position and a second reel driving position; means for selectively slidably said slide means to either of said positions; and operating means on said slide means for selectively operating said clutch means, said tape contact means, and said switch means.

12. A reversible tape machine for selectively operating on either first or second paths on a tape, depending on the direction of transport of said tape, which machine includes: a tape deck having an upper surface for mounting tape reels with space between them to provide a tape path between said reels; first and second tape reels rotatably mounted on said tape deck; rotatable tape tensioning means and reversible driving means therefor, for pulling said tape selectively from one of said first or second reels; first and second head means, one for each of said tape tracks, one of said heads being located on each side of said tape tensioning means along said tape path; tape reversing slide means in said tape machine, said reversing slide means being slidable selectively to first and second slide positions; first and second clutch means for selectively driving one of said first and second reels in co-operation with said tape tensioning means; clutch operating means on said reversing slide means for selectively operating one of said first and second clutch means; head selecting switch means operated by said reversing slide means to selectively place the appropriate one of said first and second head means in operation; first and second pressure pad means for pressing said tape into operative engagement with said first and second head means, respectively; means co-operating with said reversing slide means for selectively placing one of said first and second pressure pad means in engagement against its corresponding head means to co-operate with the transport direction of said tape between said first and second reels; and reversing means operated by said reversing slide means to select the appropriate direction of rotation for said reversible tape tensioning means.

13. A reversible tape machine for selectively operating on either first or second paths on a tape, depending on the direction of transport of said tape, which machine includes: a tape deck having an upper surface for mounting tape reels with space between them to provide a tape path between said reels; first and second tape reels rotatably mounted on said tape deck; rotatable tape tensioning means and reversible driving means therefor, for pulling said tape selectively from one of said first or second reels; first and second head means, one for each of said tape tracks, one of said heads being located on each side of said tape tensioning means along said tape path; tape reversing slide means in said tape machine, said reversing slide means being slidable selectively to first and second slide positions; first and second clutch means for selectively driving one of said first and second reels in co-operation with said tape tensioning means; clutch operating means on said reversing slide means for selectively operating one of said first and second clutch means; dragging means for selectively dragging the one of said first and second reels not placed in driving engagement by one of said clutch means; head selecting switch means operated by said reversing slide means to selectively place the appropriate one of said first and second head means in operation; first and second pressure pad means for pressing said tape into operative engagement with said first and second head means, respectively; means co-operating with said reversing slide means for selectively placing one of said first and second pressure pad means in engagement against its corresponding head means to co-operate with the transport direction of said tape between said first and second reels; and motor reversing switch means operated by said reversing slide means to select the appropriate direction of rotation for said reversible tape tensioning means.

14. A reversible tape player for selectively playing either first or second paths on a tape, depending on the direction of transport of said tape, which machine includes: a tape deck having an upper surface for mounting tape reels with space between them to provide a tape path between said reels; first and second tape reels rotatably mounted on said tape deck; rotatable tape tensioning means and reversible driving means therefor, for pulling said tape selectively from one of said first or second reels; first and second head means for operating on one of said tape tracks, one on each side of said tape tensioning means along said tape path; tape reversing slide means in said tape player, said reversing slide means being slidable selectively to first and second slide positions; first and second clutch means for selectively driving one of said first and second reels in co-operation with said tape tensioning means; clutch operating means on said reversing slide means for selectively operating one of said first and second clutch means; dragging means for selectively dragging the one of said first and second reels not placed in driving engagement by one of said clutches; head selecting switch means operated by said reversing slide means to selectively place the appropriate one of said first and second head means in operation; first and second pressure pad means for pressing said tape into operative engagement with said first and second head means, respectively; means co-operating with said reversing slide means for selectively placing one of said first and second pressure pad means in engagement against its corresponding head means to co-operate with the transport direction of said tape between said first and second reels; motor reversing switch means operated by said reversing slide means to select the appropriate direction of rotation for said reversible tape tensioning means; an on-off slide means in said tape player, said slide means being slidable between an on position and off position; tension idler means movable with said on-off slide to selectively place said tape tensioning means in or out of operation; and switch means operated by said on-off slide means for connecting said tape machine to electrical power when said slide means is in an on position.

References Cited by the Examiner

UNITED STATES PATENTS

| | | | |
|---|---|---|---|
| 2,702,833 | 2/1955 | Camras ---------- | 179—100.2 |
| 2,920,148 | 1/1960 | Munroe ---------- | 179—100.2 |

BERNARD KONICK, *Primary Examiner.*

L. G. KURLAND, *Assistant Examiner.*